United States Patent
Henson

(10) Patent No.: US 6,904,048 B2
(45) Date of Patent: Jun. 7, 2005

(54) SANITIZING FIBER CHANNEL FRAMES

(75) Inventor: Karl M. Henson, Rancho Santa Margarita, CA (US)

(73) Assignee: Emulex Design & Manufacturing Corporation, Costa Mesa, CA (US)

(*) Notice: Subject to any disclaimer, the term of this patent is extended or adjusted under 35 U.S.C. 154(b) by 0 days.

(21) Appl. No.: 10/376,659

(22) Filed: Feb. 28, 2003

(65) Prior Publication Data

US 2003/0147413 A1 Aug. 7, 2003

Related U.S. Application Data

(63) Continuation of application No. 09/774,428, filed on Jan. 30, 2001, now Pat. No. 6,600,753, which is a continuation of application No. 09/234,231, filed on Jan. 20, 1999, now Pat. No. 6,226,299.

(51) Int. Cl.[7] .............................................. H04L 12/56
(52) U.S. Cl. ...................................... 370/420; 370/452
(58) Field of Search ........................ 370/420, 452–456, 370/462, 535

(56) References Cited

U.S. PATENT DOCUMENTS

| | | | | |
|---|---|---|---|---|
| 4,288,871 A | * | 9/1981 | Baugh | 370/268 |
| 4,932,023 A | * | 6/1990 | Geyer et al. | 370/456 |
| 5,051,998 A | * | 9/1991 | Murai et al. | 714/762 |
| 5,163,047 A | * | 11/1992 | Perdikaris et al. | 370/401 |
| 5,349,582 A | * | 9/1994 | Bisdikian et al. | 370/440 |
| 5,495,580 A | | 2/1996 | Osman | |
| 5,504,748 A | * | 4/1996 | Potter et al. | 370/440 |
| 5,522,047 A | | 5/1996 | Grow et al. | |
| 5,638,512 A | | 6/1997 | Osman et al. | |
| 5,638,518 A | * | 6/1997 | Malladi | 709/251 |
| 5,659,718 A | | 8/1997 | Osman et al. | |
| 5,673,363 A | * | 9/1997 | Jeon et al. | 704/270 |
| 5,727,218 A | * | 3/1998 | Hotchkin | 710/260 |
| 5,751,715 A | * | 5/1998 | Chan et al. | 370/455 |
| 5,931,947 A | * | 8/1999 | Burns et al. | 713/201 |
| 6,014,383 A | * | 1/2000 | McCarty | 370/453 |
| 6,038,235 A | * | 3/2000 | Ho et al. | 370/462 |
| 6,160,813 A | * | 12/2000 | Banks et al. | 370/422 |
| 6,226,299 B1 | * | 5/2001 | Henson | 370/420 |
| 6,343,068 B1 | * | 1/2002 | Yamamoto et al. | 359/110 |
| 6,353,908 B1 | * | 3/2002 | Heinrich | 370/224 |
| 6,600,753 B2 | * | 7/2003 | Henson | 370/420 |
| 2002/0110120 A1 | * | 8/2002 | Hagglund et al. | 370/389 |

FOREIGN PATENT DOCUMENTS

| | | |
|---|---|---|
| JP | 63-031332 | 2/1988 |
| JP | 63-212238 | 9/1988 |
| JP | 07-058769 | 3/1995 |

OTHER PUBLICATIONS

Fiber Channel Tutorial, http://www.fibrechannel.com/technology/tutorial.htm.
Fibre Channel Overview, http://www.cern.ch/HSI/fcs/spec/overview.htm.
Fibre Channel Glossary, http://www.iol.unh.edu/training/fc/fcglossary.html.

* cited by examiner

*Primary Examiner*—Chi Pham
*Assistant Examiner*—Derrick W Ferris
(74) *Attorney, Agent, or Firm*—Morrison & Foerster LLP

(57) ABSTRACT

A system and method of sanitizing a data frame from a node in a network loop includes receiving the data frame from the node, and, when the data frame includes invalid data, replacing a first word of the invalid data with a frame termination primitive and subsequent words of the invalid data with buffer data.

2 Claims, 5 Drawing Sheets

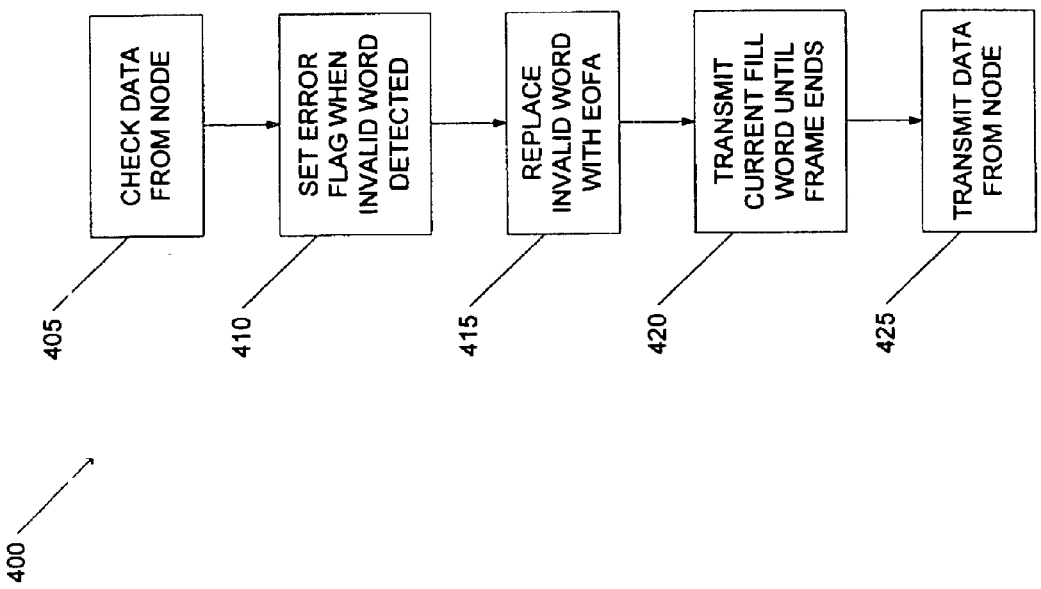

SANITIZING FIBER CHANNEL FRAMES

This application is a continuation of U.S. application Ser. No. 09/774,428 filed on Jan. 30, 2001, now U.S. Pat. No. 6,600,753 which is a continuation of U.S. Ser. No. 09/234,231 filed Jan. 20, 1999, which issued as U.S. Pat. No. 6,226,229. The entire disclosure of such prior applications are hereby incorporated by reference.

TECHNICAL FIELD

The present invention relates to electronic network communications systems, and more specifically to sanitizing a datastream between ports in a network loop.

BACKGROUND INFORMATION

Electronic data systems are frequently interconnected using network communication systems. Area-wide networks and channels are two approaches that have been developed for computer network architectures. Traditional networks (e.g., LAN's and WAN's) offer a great deal of flexibility and relatively large distance capabilities. Channels, such as the Enterprise System Connection (ESCON) and the Small Computer System Interface (SCSI), have been developed for high performance and reliability. Channels typically use dedicated short-distance connections between computers or between computers and peripherals.

Features of both channels and networks have been incorporated into a new network standard known as "Fibre Channel". Fibre Channel systems combine the speed and reliability of channels with the flexibility and connectivity of networks. Fibre Channel products currently can run at very high data rates, such as 1062 Mbps. These speeds are sufficient to handle quite demanding applications, such as uncompressed, full motion, high-quality video. ANSI specifications, such as X3.230-1994, define the Fibre Channel network. This specification distributes Fibre Channel functions among five layers. The five functional layers of the Fibre Channel are: FC-0—the physical media layer; FC-1—the coding and encoding layer; FC-2—the actual transport mechanism, including the framing protocol and flow control between nodes; FC-3—the common services layer; and FC-4—the upper layer protocol.

There are generally three ways to deploy a Fibre Channel network: simple point-to-point connections; arbitrated loops; and switched fabrics. The simplest topology is the point-to-point configuration, which simply connects any two Fibre Channel systems directly. Arbitrated loops are Fibre Channel ring connections that provide shared access to bandwidth via arbitration. Switched Fibre Channel networks, called "fabrics", are a form of cross-point switching.

Conventional Fibre Channel Arbitrated Loop ("FC-AL") protocols provide for loop functionality in the interconnection of devices or loop segments through node ports. However, direct interconnection of node ports is problematic in that a failure at one node port in a loop typically causes the failure of the entire loop. This difficulty is overcome in conventional Fibre Channel technology through the use of hubs. Hubs include a number of hub ports interconnected in a loop topology. Node ports are connected to hub ports, forming a star topology with the hub at the center. Hub ports which are not connected to node ports or which are connected to failed node ports are bypassed. In this way, the loop is maintained despite removal or failure of node ports.

More particularly, an FC-AL network is typically composed of two or more node ports linked together in a loop configuration forming a single data path. Such a configuration of a node port-to-node port loop is shown in FIG. 1. In FIG. 1, six node ports 102, 104, 106, 108, 110, 112 are linked together by data channels 114, 116, 118, 120, 122, 124. In this way, a loop is created with a datapath from node port 102 to node port 104 through data channel 114 then from node port 104 to node port 106 through data channel 116, and so on to node port 102 through data channel 124.

When there is a failure at any point in the loop, the loop datapath is broken and all communication on the loop halts. For example, if node port 104 fails, data no longer passes through node port 104. A failure may also occur in a data channel between node ports, such as by a physical break in the wire or electromagnetic interference causing significant data corruption or loss at that point. At this point, loop 100 has been broken. Data no longer flows in a circular path and the node ports are no longer connected to one another. The loop has, in effect, become a unidirectional linked list of node ports.

A conventional technique to avoid broken datapaths in a node port-to-node port loop introduces a hub within a loop. A hub creates a physical configuration of node ports in a star pattern, but the virtual operation of the node ports continues in a loop pattern. The connection process (i.e., sending data between node ports) and interaction with the hubs is effectively transparent to the node ports connected to the hub, which perceive the relationship as a standard Fibre Channel arbitrated loop configuration.

FIG. 2 illustrates an arbitrated loop 200 with a centrally connected hub. Similar to loop 100 illustrated in FIG. 1, loop 200 includes six node ports 202, 204, 206, 208, 210, 212, each attached to a hub 214. Hub 214 includes six hub ports 216, 218, 220, 222, 224, 226 where each hub port is connected to another hub port in a loop topology by a sequence of internal hub links. In this way, node ports 202–212 are each connected to a corresponding hub port 216–226. Thus, node ports 202–212 operate as though connected in a loop fashion as illustrated in FIG. 1. Data typically flows into a hub port from an upstream hub port, into the attached node port, back from the node port to the hub port, and out of the hub port to a downstream hub port.

When a node port or a data channel fails or is disconnected, the loop is maintained by bypassing the failed node port. In a conventional hub, when a hub port no longer receives data from a node port, the hub port goes into a bypass mode. In bypass mode, rather than passing data received on the data channel from the node port, the hub port passes data received along the internal hub link from the previous, upstream hub port. Thus, nodes are removed and inserted in the loop by changing the corresponding hub port in and out of bypass mode.

The content of a datastream of an FC-AL network is defined by FC-AL protocols. Characters are constantly moving through the loop from one port to the next. These characters may be actual data or loop control signals. Loop control signals are always present in the datastream except when a data frame is being sent from a source node port to a destination node port. Under FC-AL protocols, the loop control signals are ordered sets, including primitive signals and primitive sequences. Ordered sets typically begin with a special character indicating the beginning of an ordered set, such as K28.5.

A data frame includes a series of one or more data words preceded by a frame initiation primitive and followed by a frame termination primitive. An FC-AL data frame includes an uninterrupted stream of data preceded by a special ordered set called a Start Of Frame ("SOF") and succeeded by a special ordered set called an End Of Frame ("EOF"). An End Of Frame Abort ("EOFA") is a special type of EOF ordered set, for aborting a frame. An interframe gap occurs after a frame termination primitive and before the next frame initiation primitive. Under FC-AL protocols, an interframe gap is defined to include six ordered sets, by default.

A datastream of encoded characters ideally always has a valid "running disparity". The encoded characters are defined according to a conventional 8B/10B encoding scheme, defined in Fibre Channel protocols. The running disparity at the end of a character in the datastream is the difference between the number of 1's and 0's in the bit encoding of the character. A character with more 1's than 0's has a positive running disparity. A character with more 0's than 1's has a negative running disparity. A character with an equal number of 1's and 0's has a neutral running disparity. An encoder transmits a positive, negative, or neutral disparity encoded character. A neutral character does not affect the running disparity of the datastream. A positive character changes the running disparity from negative to positive and a negative character changes the running disparity from positive to negative.

Each word has an overall running disparity as well. The running disparity for a word determines the effect that word has on the running disparity of the datastream. As with characters, a word with a positive running disparity changes the running disparity to positive at the end of the word. Similarly, a word with a negative disparity changes the running disparity to negative and a word with a neutral disparity leaves the running disparity the same as the running disparity before the word.

The running disparity between the words that form the interframe gap is defined to be negative. The last word of a frame, an EOF, ensures that the running disparity is negative. Each ordered set in the gap between frames has an overall running disparity of neutral so that the running disparity at the end of each word remains negative.

If the encoder sends a negative disparity encoded character when the running disparity is negative, or a positive encoded character when the running disparity is positive, a running disparity error results. This error typically introduces an invalid character into the loop.

Ideally, all the data in the loop are valid data characters, all the control signals are valid ordered sets, there are no running disparity errors, data is properly formatted into data frames, and only ordered sets are present between data frames. However, errors are sometimes introduced into loops for a variety of reasons, such as when devices are inserted into the loop, bad cables are used, or when a device does not comply with FC-AL protocols. These errors can create invalid characters and hence invalid transmission words inside of data frames. Invalid transmission words occur when: a word, either a data word or an ordered set, includes an invalid character; an ordered set does not have the correct beginning running disparity; or, a word includes a misaligned special character.

The conventional solution upon receiving an invalid transmission word is to replace the invalid character in the invalid transmission word with a valid transmission character. This replacement typically occurs when the invalid word is decoded. The decoder generates a valid word by replacing the invalid character in the received word with a pseudo-random valid character. Hence, this replacement simply "hides" an error in a seemingly valid word. In addition, this replacement does not correct for an invalid transmission word caused by invalid special character alignment. Because these errors remain uncorrected, they are also in effect hidden. Thus, data frames which include hidden errors can propagate throughout the loop. The downstream ports do not have any indication that the frame was received in error. When the seemingly valid word is later encoded at a downstream hub port, the hidden error is included in the encoded word, further compounding the error. Because of these hidden errors, the destination node needs to check the CRC (i.e., cyclical redundancy checking) code for each frame to ensure that the frame does not include such hidden errors.

The inventor has determined that it would be desirable to provide apparatus and methods for clearly identifying frames which are received in error and avoiding the propagation of data frames including hidden errors.

SUMMARY

The invention provides methods and apparatus for implementing a technique for sanitizing data frames in a network loop. In a preferred implementation, a port for connecting a node to a network loop includes a detect element, where the detect element monitors data from the node and sets an error flag when invalid data is received at the port; a frame termination generator, which generates frame termination primitives; a buffer data generator, which generates buffer data; a switching element having a control input, an output, and a plurality of data inputs, where each of an output of the node, the upstream node, the frame termination generator, and the buffer data generator is connected to a corresponding data input; and a control element connected to the detect element and the control input of the switching element, where the control element selects, according to the error flag, one of the data inputs of the switching element to connect to the output of the switching element to be output by the port to a downstream node, and the control element terminates a current data frame by selecting the data input corresponding to the frame termination generator when the error flag indicates the current data frame includes invalid data.

In an FC-AL implementation, a hub port for connecting a node to a network loop includes a node port input, connected to an output of the node; a detection circuit connected to the node port input, where the ordered set detection circuit monitors data from the node, and sets an error flag when an invalid character is received at the hub port from the node and sets an interframe flag when an ordered set which is not an end of frame ordered set is received at the hub port from the node; an end of frame generator, which generates end of frame abort ordered sets; a current fill word generator, which generates current fill word ordered sets; a hub port output; a hub port input; a multiplexor having a multiplexor control input, a multiplexor output, and a plurality of multiplexor inputs, where the multiplexor output is connected to the hub port output and each of the node port input, the hub port input, the end of frame generator, and the current fill word generator is connected to a corresponding multiplexor input; and an output control circuit connected to the detection circuit and the multiplexor control input, where the output control circuit controls which multiplexor input is connected to the multiplexor output according to the error flag and the interframe flag.

In another implementation, node data is received from a node. When the node data is invalid data, a frame termination primitive is transmitted to a downstream node. After transmitting the frame termination primitive, buffer data is transmitted to the downstream node until a data frame including the invalid data from the node ends. The node can be in a network loop, such as an FC-AL. In an FC-AL implementation, the frame termination primitive is an end of frame abort ordered set, and the buffer data is a current fill word The technique of the present invention provides several advantages. A data frame which contained an error is positively identified as the frame flows through the loop. The received invalid transmission word does not cause subsequent errors to be logged unnecessarily by downstream node ports and hub ports. When the first detected invalid transmission word in a frame is in fact the first in a series of invalid transmission words in the frame, all of the following invalid words are replaced by fill words.

BRIEF DESCRIPTION OF THE DRAWINGS

FIG. 4 is a flow chart of a process of sanitizing a data frame.

DETAILED DESCRIPTION

The invention provides apparatus and methods for sanitizing data frames in a network loop. The invention is explained below in the context of a Fibre Channel Arbitrated Loop ("FC-AL") network as an illustration of a preferred implementation. However, the invention may have applicability to networks with similar characteristics to FC-AL networks.

Figure 1:
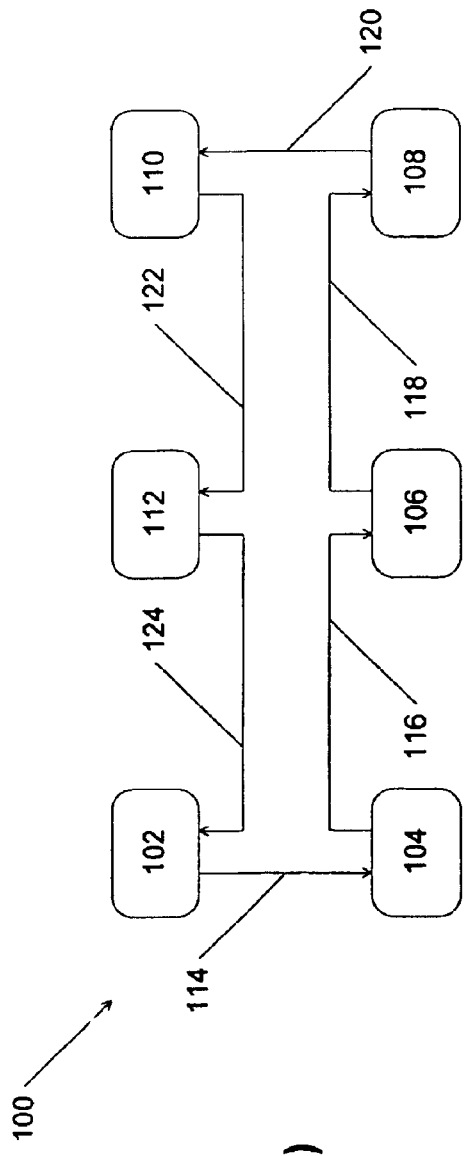
FIG. 1 shows a prior art loop of directly interconnected node ports.
Figure 2:
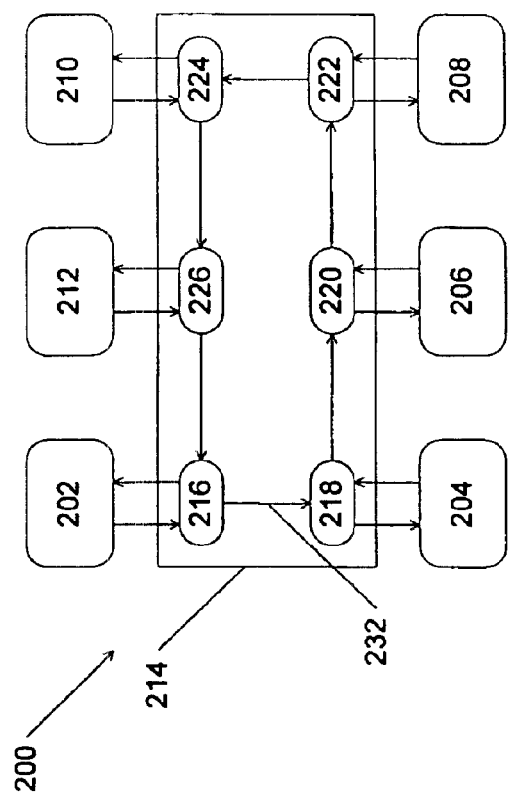
FIG. 2 shows a prior art loop including a hub.

In a preferred implementation, each hub port of a hub in a network loop connects an attached node port to the loop (recall FIG. 2). Not all hub ports are necessarily attached to node ports at all times. Each hub port includes components to detect invalid data, network primitives, and frame termination primitives. Using these detection components, a hub port monitors the datastream from the node port connected to the hub port. The hub port detects any invalid words in a data frame received from the connected node port. The hub port replaces the first invalid word in the frame with a frame termination primitive. The hub port replaces the remaining words in the frame with buffer data, including the frame termination primitive at the end of the frame. In an FC-AL implementation, the invalid word is replaced with an EOFA ordered set and the remainder of the words in the frame are replaced with current fill words. After the frame ends, the hub port returns to passing the data from the node port to the downstream hub port.

By replacing an invalid word with a frame termination primitive, a frame including an invalid word is terminated and the invalid word is not propagated throughout the loop. A data frame which contained an error is positively identified as the frame flows through the loop. The received invalid transmission word does not cause subsequent errors to be logged by downstream node ports and hub ports. In addition, when the first detected invalid transmission word in a frame is in fact the first in a series of invalid transmission words in the frame, all of the following invalid words are replaced by buffer data.

Figure 3A:
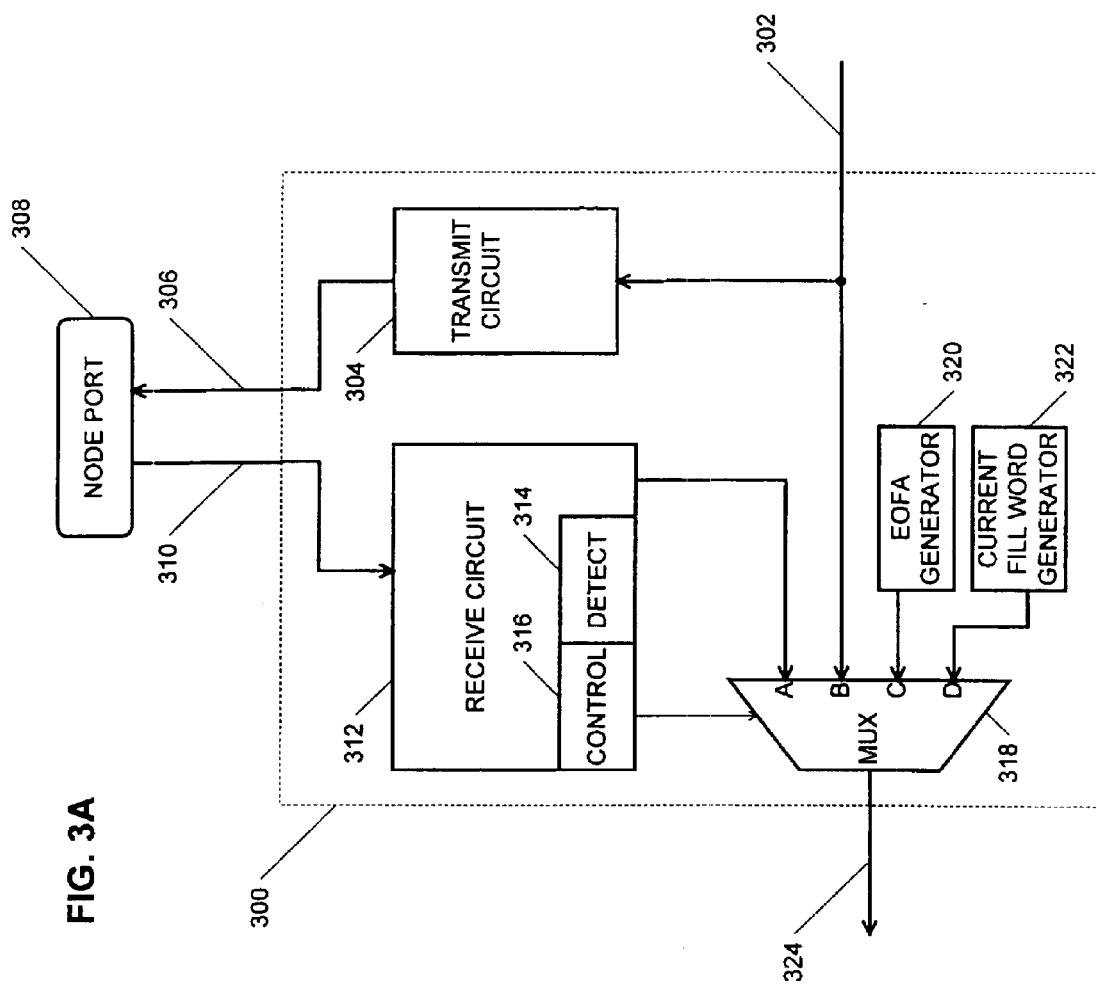
FIG. 3A shows a block diagram of a hub port according to the invention.

FIG. 3A shows a hub port 300 according to a preferred implementation. Hub port 300 includes an incoming internal hub link 302 connected to a transmit circuit 304. Incoming internal hub link 302 carries data from an upstream hub port (not shown) to hub port 300 and into transmit circuit 304. Transmit circuit 304 transmits the data to node port 308 on a data channel 306 in a form usable to node port 308. Node port 308 is a connection to a node or loop segment (not shown). In an FC-AL implementation, transmit circuit 304 preferably encodes (preferably using 8B/10B encoding) and serializes the data before transmitting the data to node port 308. Transmit circuit 304 encodes the data to maintain correct running disparity.

Node port 308 transmits data from the node back to hub port 300 on a data channel 310. Data channel 310 is connected to a receive circuit 312. In an FC-AL implementation, receive circuit 312 preferably deserializes and decodes the data from node port 308, preferably using 10B/8B decoding. Receive circuit 312 includes a detect circuit 314 and an output control circuit 316. Detect circuit 314 can also be connected to incoming internal hub link 302. Detect circuit 314 monitors the content of the datastream from node port 308 and sends flags to output control circuit 316, described in more detail below. In an alternative implementation, instead of responding to separate flags generated by detect circuit 314, control circuit 316 directly monitors the datastream to be output by receive circuit 312. Alternatively, detect circuit 314 and control circuit 316 are combined into a single component.

A switching device such as a multiplexor 318 controls the output of hub port 300 in response to control signals from output control circuit 316. Receive circuit 312 sends data from node port 308 to a first data input A of multiplexor 318. Incoming internal hub link 302 is connected to a second data input B of multiplexor 318. A frame termination generator 320 is connected to a third data input C of multiplexor 318. Frame termination generator 320 preferably generates frame termination primitives. In an FC-AL implementation, frame termination generator 320 preferably generates EOFA ordered sets. As noted above, an EOFA ordered set is a special type of EOF ordered set indicating an abort of the current frame. A buffer data generator 322 is connected to a fourth data input D of multiplexor 318. Buffer data generator 322 preferably generates buffer data. In an FC-AL implementation, buffer data generator 322 preferably generates current fill words according to FC-AL protocols. In one implementation, buffer data generator 322 generates a current fill word which is the same as the last fill word received by the hub port from the node port before the current frame began.

An output of multiplexor 318 is connected to an outgoing internal hub link 324. Output control circuit 316 is connected to a control input of multiplexor 318 to select the data input of multiplexor 318 to connect to outgoing internal hub link 324. Outgoing internal hub link 324 sends data to a downstream hub port (not shown) in the loop.

In operation, when hub port 300 is in bypass mode, such as when a node is not connected to hub port 300 or the node has failed, output control circuit 316 causes data input B to be connected to outgoing internal hub link 324. When hub port 300 is not in bypass mode, output control circuit 316 causes data input A to be connected to outgoing internal hub link 324.

Figure 3B:
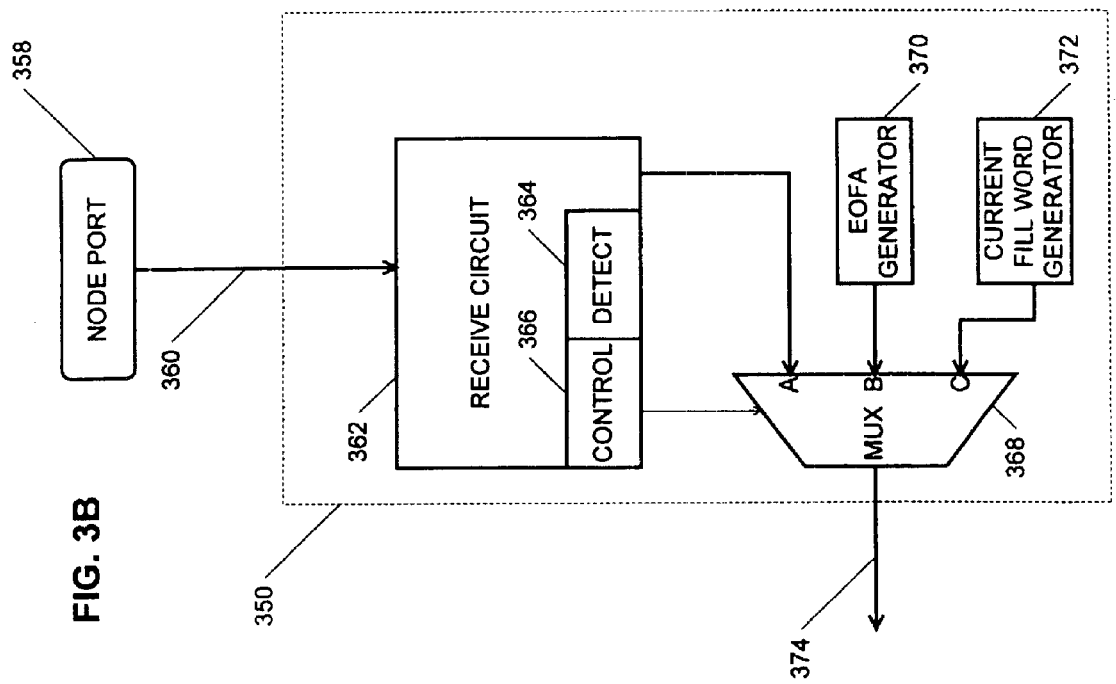
FIG. 3B shows a block diagram of a sanitization component according to the invention.

FIG. 3B shows another implementation which does not include a connection to an upstream node port. The components shown in FIG. 3B operate similarly to those described above with respect to FIG. 3A. A sanitization component 350 receives data from a node port 358, processes and outputs data on outgoing link 374 as described above. The sanitization component 350 can be positioned in a hub or between the node port 358 and the device to which the node port 358 is connected, such as a hub or another node port.

FIG. 4 shows a process 400 of sanitizing data from node port 308. Hub port 300 examines the datastream from the upstream node (step 405). Detect circuit 314 checks each word in the datastream. When detect circuit 314 detects an invalid transmission word in a data frame, indicated by an invalid character, detect circuit 314 sets an error flag (step 410). The error flag indicates to output control circuit 316 that the current word in the datastream from node port 308 is invalid. In response, output control circuit 316 causes multiplexor 318 to connect data input C to outgoing internal hub link 324 (step 415), such that the invalid data from node port 308 is replaced by a frame termination primitive from frame termination generator 320. As a result, the inserted frame termination primitive terminates the current frame. After one frame termination primitive has been inserted into the datastream sent to the downstream hub port, output control circuit 316 causes multiplexor 318 to connect data input D to outgoing internal hub link 324, such that buffer data from buffer data generator 322 is inserted into the datastream and sent to the downstream hub port (step 420). Detect circuit continues to monitor the datastream from node port 308 to determine the end of the current frame. When detect circuit 314 detects a primitive which is not a frame termination primitive, detect circuit 314 sets an interframe flag. The interframe flag indicates to output control circuit 316 that the current frame in the datastream from node port 308 has ended. In response, output control circuit 316 causes multiplexor 318 to connect data input A to outgoing internal hub link 324 (step 425), such that data from node port 308 is transmitted to the downstream hub port.

Figure 5A:
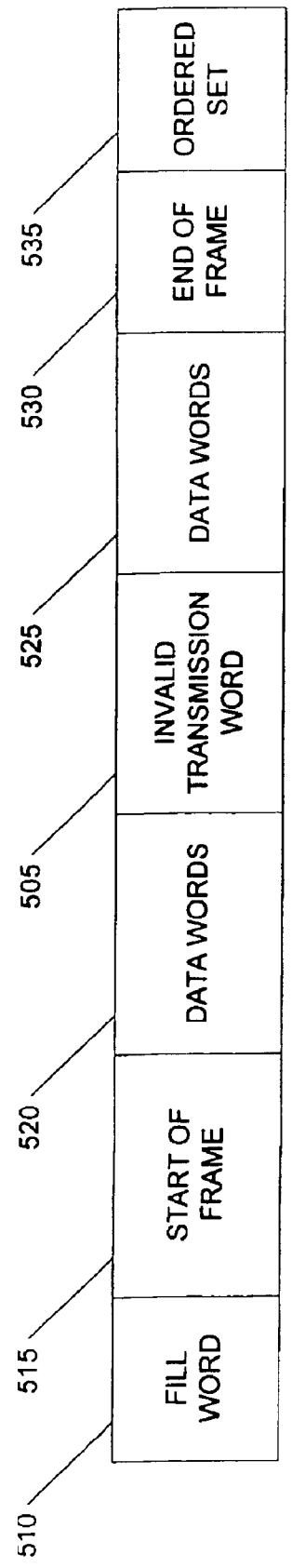
FIG. 5A shows a datastream received by a hub port.
Figure 5B:
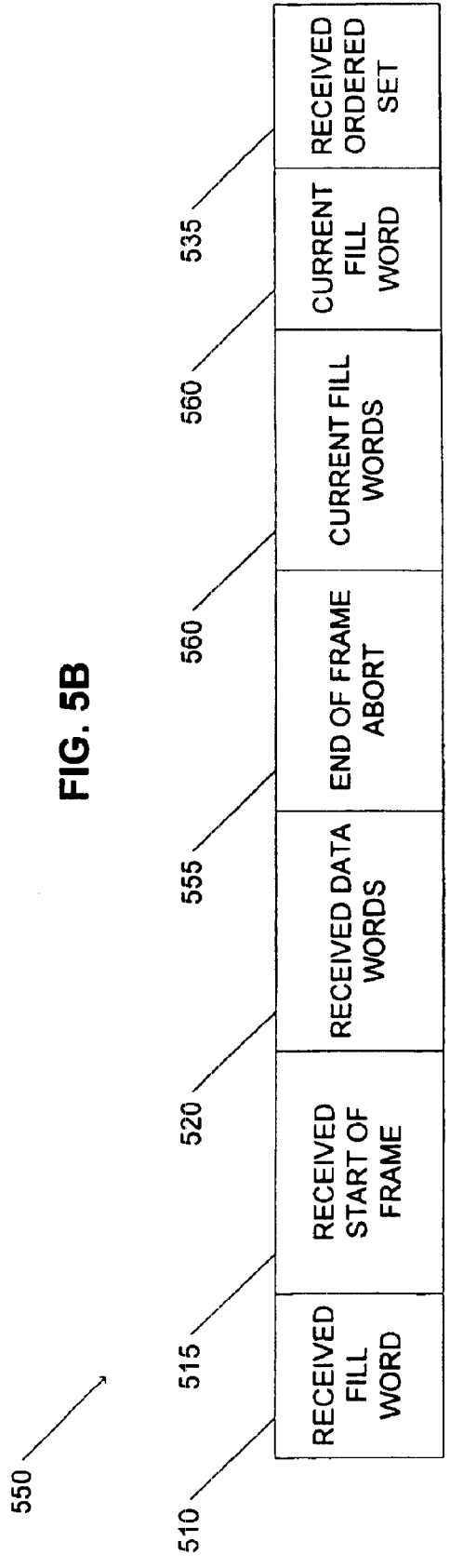
FIG. 5B shows a sanitized datastream output by a hub port of a preferred implementation.

FIGS. 5A and 5B illustrate the change in an FC-AL datastream caused by a hub port according to the invention. FIG. 5A shows an FC-AL datastream 500 received from a node port including an invalid transmission word 505. The received datastream 500 sequentially includes a fill word 510, an SOF ordered set 515, zero or more data words 520, invalid transmission word 505, zero or more data words 525, an EOF ordered set 530, and an ordered set 535. FIG. 5B shows a datastream 550 output by the hub port in response to receiving the datastream 500 shown in FIG. 5A. The hub port outputs without change fill word 510, SOF 515, and data words 520 as received by the hub port before invalid transmission word 505. The hub port replaces invalid transmission word 505 with an EOFA ordered set 555, aborting the current frame. The hub port replaces data words 525 and EOF 530 with current fill words 560. Current fill words 560 are preferably the same fill word as fill word 510 which immediately preceded the current frame. The hub port outputs without change ordered set 535 which followed the end of the frame.

The sanitization process described above can be implemented in various alternative ways. In one alternative implementation, the sanitization process occurs in the node itself, rather than in a hub port. Such a node can be connected directly to other nodes. The node connection circuits can alter the datastream output by the node, again using the techniques described above. In another implementation, nodes are directly interconnected and the sanitization process is carried out by a component introduced into a connection or link between nodes. A separate sanitization component can be introduced between each pair of neighboring nodes in a loop of nodes. In another implementation, a centralized sanitization component can be connected to each of the nodes similar to a hub.

Various implementations of the invention have been described. However, variations which fall within the scope of the following claims are within the scope of the present invention. For example, the detect circuit and the output control circuit may be positioned outside the receive circuit of a hub port. Alternatively, the switching device (e.g., multiplexor 318 in FIG. 3A) may be a cross-point switch. In another implementation, the technique can be implemented in programmable hardware or software. Accordingly, the present invention is not limited to the implementations described above but only by the scope of the following claims.

What is claimed is:

1. A method of sanitizing a data frame from a first node in a network loop, comprising:

receiving the data frame from a first node; and transmitting the data frame to a second node downstream from the first node in the network loop;

when the received data frame comprises invalid data, before transmitting the data frame to the second node, replacing a first word of the invalid data with a frame termination primitive and all subsequent words of the data of the data frame with data that is not related to the data of the data frame.

2. A system for sanitizing a data frame from a first node in a network loop, comprising:

means for receiving the data frame comprising invalid data from the first node;

means for replacing a first word of the invalid data with a frame termination primitive and all subsequent data words of the data frame with data that is not related to the data of the data frame; and means for transmitting the data frame to a second node downstream from the first node.

* * * * *